United States Patent
Xi et al.

(10) Patent No.: US 9,890,888 B2
(45) Date of Patent: Feb. 13, 2018

(54) ROTATABLE JOINT

(71) Applicants: FU DING ELECTRONICAL TECHNOLOGY (JIASHAN) CO.,LTD., Zhejiang (CN); HON HAI PRECISION INDUSTRY CO., LTD., New Taipei (TW)

(72) Inventors: Zheng-Yue Xi, Jiashan (CN); Xue-Wen Li, Jiashan (CN); De-Bing Liu, Jiashan (CN)

(73) Assignees: FU DING ELECTRONICAL TECHNOLOGY (JIASHAN) CO., LTD., Jiashan (CN); HON HAI PRECISION INDUSTRY CO., LTD., New Taipei (TW)

( * ) Notice: Subject to any disclaimer, the term of this patent is extended or adjusted under 35 U.S.C. 154(b) by 833 days.

(21) Appl. No.: 14/477,000

(22) Filed: Sep. 4, 2014

(65) Prior Publication Data

US 2015/0069751 A1    Mar. 12, 2015

(30) Foreign Application Priority Data

Sep. 10, 2013    (CN) ..................... 2013 2 0557937 U

(51) Int. Cl.
*F16L 39/04* (2006.01)
*F16L 27/08* (2006.01)

(52) U.S. Cl.
CPC ........... *F16L 39/04* (2013.01); *F16L 27/0824* (2013.01)

(58) Field of Classification Search
CPC ............... F16L 27/0824; F16L 27/0804; F16L 27/0828; F16L 27/0832; F16L 39/04
USPC .. 285/98, 121.3, 121.4, 121.5, 121.6, 148.4, 285/272, 273, 275, 276, 280, 281
See application file for complete search history.

(56) References Cited

U.S. PATENT DOCUMENTS

| | | | | |
|---|---|---|---|---|
| 4,561,681 A * | 12/1985 | Lebsock | ............. | F16L 27/0828 285/276 X |
| 4,858,961 A * | 8/1989 | Nunogaki | ............... | F16L 39/04 285/121.6 X |
| 5,022,686 A * | 6/1991 | Heel | ................... | F16L 27/0828 285/121.4 |
| 8,800,962 B2 * | 8/2014 | Ritter | | |
| 2004/0189005 A1 * | 9/2004 | Mikiya | ......................... | 285/276 |

* cited by examiner

*Primary Examiner* — Gregory J Binda
*Assistant Examiner* — Zachary T Dragicevich
(74) *Attorney, Agent, or Firm* — ScinBiziP, P.C.

(57) ABSTRACT

A rotatable joint to carry high-pressure and low-pressure liquids to a workstation can include a housing, two connecting heads, a first connecting member, a second connecting member, and a rotation member. The housing defines a first connecting hole positioned along a center housing axis and a second connecting member spaced from the first connecting member and parallel to the housing axis. The first connecting member, the second connecting member, and the rotation member can be installed in the housing in that order. One connecting head communicates with the first connecting member, the second connecting member, and the rotation member in that order via the first connecting hole, and the other connecting head communicates with the first connecting member, the second connecting member, and the rotation member in that order, via the second connecting hole.

16 Claims, 2 Drawing Sheets

ROTATABLE JOINT

FIELD

The subject matter herein generally relates to rotating connections.

BACKGROUND

Rotatable joints are used to connect a conduit to a workstation to enable air or liquid to flow into the conduit. When the workstation rotates, the conduit can keep still.

BRIEF DESCRIPTION OF THE DRAWINGS

Implementations of the present technology will now be described, by way of example only, with reference to the attached figures.

DETAILED DESCRIPTION

Figure 1:
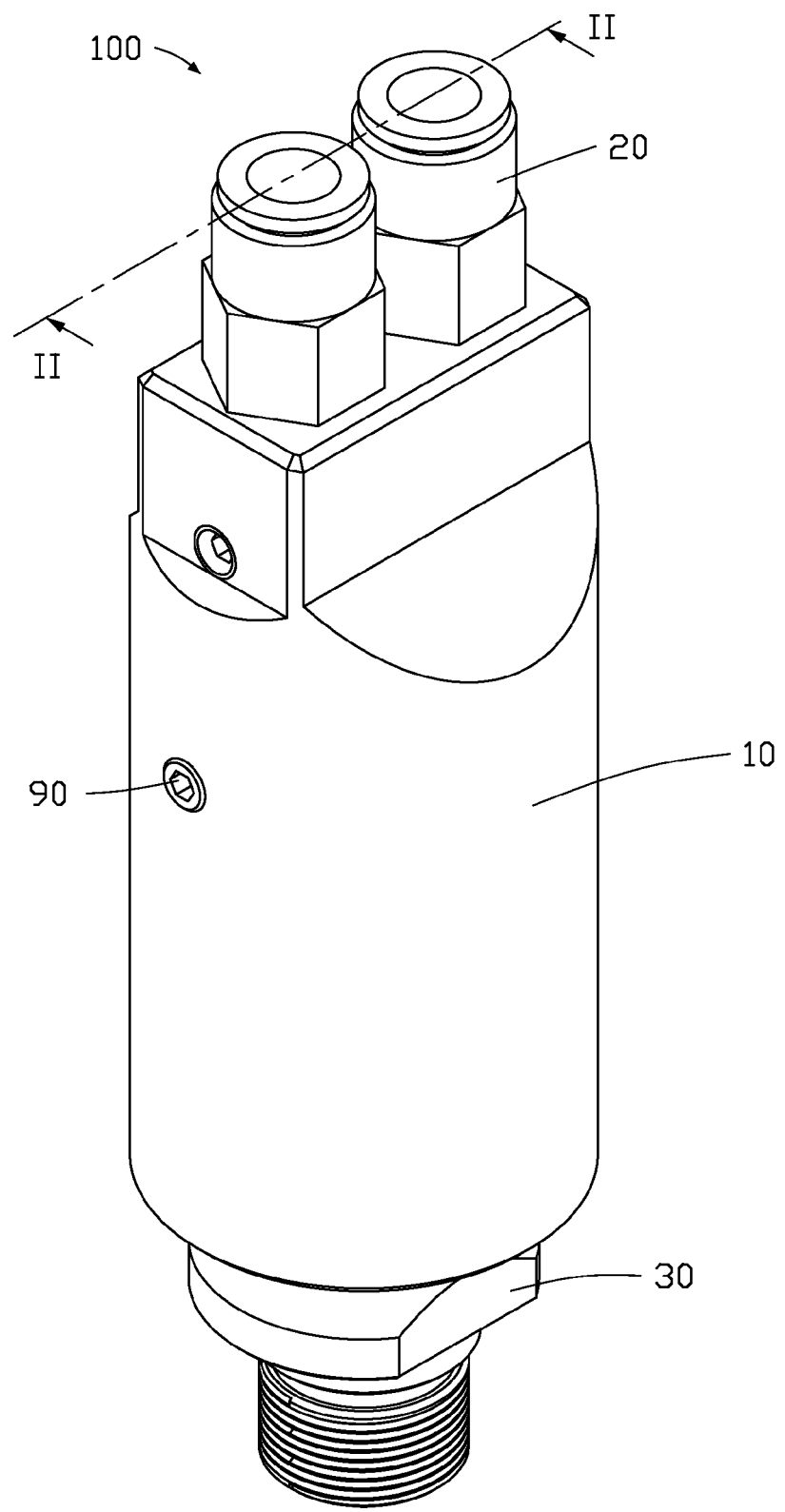
FIG. 1 is an isometric view of an embodiment of a rotatable joint.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

A rotatable jointrotatable can include a housing, two connecting heads, a first connecting member, a second connecting member, and a rotation member. The housing can define a receiving chamber, a first connecting hole communicating with the receiving chamber and located at a center of the housing, and a second connecting hole spaced from the first connecting hole and communicating with the receiving chamber. The receiving chamber, the first connecting hole, and the second connecting hole can extend along an axis of the housing. The two connecting heads can be respectively inserted in the first connecting hole and the second connecting hole. The first connecting member can be securely installed in the receiving chamber and resist against connecting surface of the receiving chamber, the first connecting hole, and the second connecting hole. An end of the first connecting member can define an annular receiving groove. The second connecting member can be arranged coaxially with the first connecting member and resist against the end of the first connecting member having the annular receiving groove. The first connecting member and the second connecting member can define a first through hole communicating with the first connecting hole and a second through hole communicating with the second connecting hole. The second through hole can be cut through a bottom wall of the annular receiving groove. The rotation member can be partially installed in the receiving chamber and define a first channel communicating with the first through hole and a second channel communicating with the second through hole.

Figure 2:
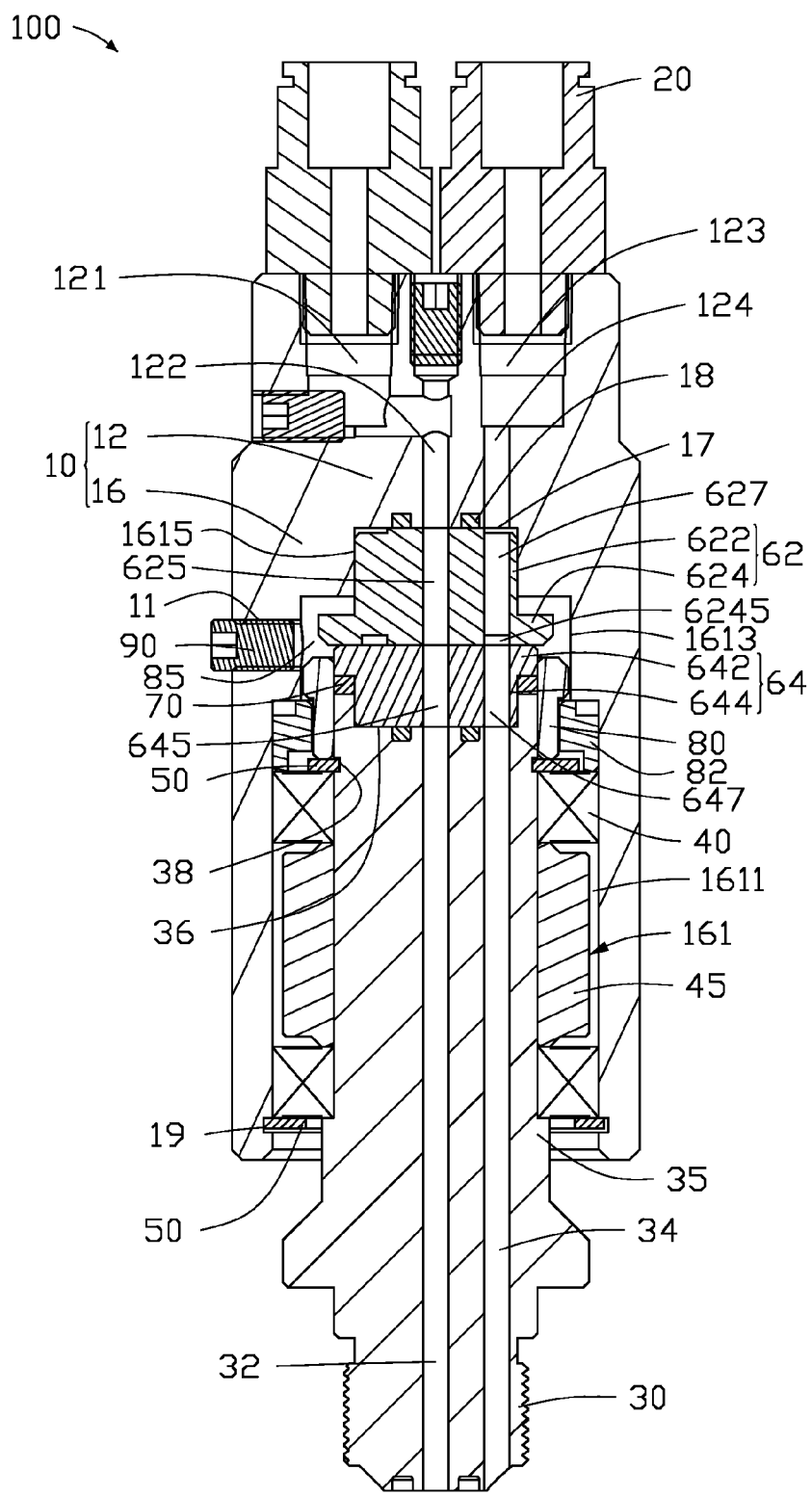
FIG. 2 is a cross-sectional view of the rotatable joint of FIG. 1, taken along line II-II of FIG. 1.

FIGS. 1 and 2 illustrate a rotatable joint 100 which is configured to couple conduits (not shown) to a workstation (not shown). The rotatable joint 100 can include a housing 10, two connecting heads 20, a rotation member 30, two bearings 40, a bushing 45, two stopper members 50, a first connecting member 62, a second connecting member 64, a plurality of seal members 70, a resisting member 80, a fixing member 82, and a plurality of stoppers 90.

The housing 10 can be substantially cylindrical and include a channel portion 12 and a receiving portion 16. The channel portion 12 can define a first insertion chamber 121, a first connecting hole 122, a second insertion chamber 123, and a second connecting hole 124. The first insertion chamber 121 can extend into the housing 10 from a first end of the housing 10. The first connecting hole 122 can be positioned substantially along, and parallel to, a housing center axis. The first connecting hole 122 can communicate with the first insertion chamber 121. The second insertion chamber 123 can extend into the housing 10 from the first end of the housing and be spaced from the first insertion chamber 121. The second connecting hole 124 can be spaced from the first connecting hole 122, communicate with the second insertion chamber 123, and extend substantially parallel to the housing center axis. The receiving portion 16 can extend from an end of the channel portion 12 away from the first housing end. The receiving portion 16 can define a receiving chamber 161 extending into the housing from a second housing end opposite to the first housing end of the housing 10. The receiving chamber 161 can have an end surface 17 closet to the first housing end and an inner surface extending substantially perpendicular from the end surface 17 toward the second housing end. The end surface 17 can be substantially stepped. The receiving chamber 161 can include a first chamber portion 1611, a second chamber portion 1613, and a third chamber portion 1615, all communicating with each other in that order. The third chamber portion 1615 can communicate with the first connecting hole 122 and the second connecting hole 124. The first connecting hole 122 and the second connecting hole 124 can cut through the end surface 17. The first chamber portion 1611, the second chamber portion 1613, and the third chamber portion 1615 can be arranged coaxially with each other. The respective diameters of the first chamber portion 1611, the second chamber portion 1613, and the third chamber portion 1615 can decrease, in that order. The channel portion 12 can define an annular receiving groove 18 around a periphery of the first connecting hole 122 on the end surface 17. The second chamber portion 1613 can define an injection hole 11 cut through a sidewall thereof. The first chamber portion 1611 can define a fixing groove 19 extending around sidewalls thereof on an end of the first chamber portion 1611. In at least one embodiment, a largest diameter of the housing 10 can be 40 millimeters.

One connecting heads 20 can be inserted into the first insertion chamber 121 and coupled to a first conduit (not shown), and the other connecting heads 20 can be inserted into the second insertion chamber 123 and coupled to a second conduit (not shown).

The rotation member 30 can be substantially cylindrical. A first end of the rotation member 30 can be received in the first chamber portion 1611, and a second end of the rotation member 30 can extend out of the first chamber portion 1611 to be coupled to the workstation. The rotation member 30 can define a first channel 32 corresponding to the first connecting hole 122 along a central axis thereof and a second channel 34 corresponding to the second connecting hole 124. The second channel 34 can extend along the axis of the rotation member 30, being spaced from the first channel 32. The central axis of the rotation member 30 can coincide with that of the housing 10. The rotation member 30 can define a receiving groove 36 on an end adjacent to the first chamber portion 1611 and a fixing groove 38 extending around sidewalls thereof. A flange 35 can protrude from an end of the rotation member 30 away from the receiving groove 36, the flange 35 extending around the sidewalls of the rotation member 30 and corresponding to the fixing groove 19.

The two stopper members 50 can each be received in a fixing groove (19, 38) and extending out of a corresponding fixing groove (19, 38). The two stopper members 50 can be located in the first chamber portion 1611. In at least one embodiment, the stopper members 50 are clamp rings.

The two bearings 40 can be sleeved on the rotation member 30 and received in the first chamber portion 1611. The bushing 45 is sandwiched between the two bearings 40, so that the two bearings 40 can be spaced from each other via the bushing 45. One bearing 40 adjacent to the second chamber portion 1613 can resist one stopper member 50, and the other bearing 40 away from the second chamber portion 1613 can resist the other stopper member 50 and the flange 35, so that the bearings 40 can be fastened to the housing 10 and the rotation member 30, and the rotation member 30 can be rotatably coupled to the housing 10 via the bearings 40. In at least one embodiment, the bushing 45 can be omitted, as long as the two bearings 40 can be coupled together. The number of bearings 40 can be one or more than two. When the number of bearings 40 is one, a first end of the bearing 40 resists one stopper member 50 and a second end of the bearing 40 resists the other stopper member 50 and the flange 35.

The first connecting member 62 can be securely installed in the third chamber portion 1615 and resist the end surface 17. The first connecting member 62 can include a connecting portion 622 and a resisting portion 624 which protrudes from an end of the connecting portion 622. A diameter of the resisting portion 624 can be greater than that of the connecting portion 622. The connecting portion 622 can be securely installed in the third chamber portion 1615 and resist the end surface 17. The resisting portion 624 can be received in the second chamber portion 1613 and define an annular receiving groove 6245 on an end thereof away from the connecting portion 622. The first connecting member 62 can define a first through hole 625 along a central axis thereof corresponding to the first connecting hole 122 and a second through hole 627. The second through hole 627 can extend along the axis of the first connecting member 62, being spaced from the first through hole 625, and to correspond to the second connecting hole 124 cut through a bottom wall of the annular receiving groove 6245.

The second connecting member 64 can be similar to the first connecting member 62. The second connecting member 64 can include a connecting portion 644 securely installed in the receiving groove 36 and resisting a bottom wall of the receiving groove 36, and a resisting portion 642 resisting the resisting portion 624 of the first connecting member 62. The second connecting member 64 can define a first through hole 645 corresponding to the first channel 32 and a second through hole 647 corresponding to the second channel 34. The first through holes (625, 645) can communicate with the first connecting hole 122 and the first channel 32. The first connecting hole 122, the first through holes (625, 645), and the first channel 32 each can extend along the central axis of the housing 10. The second through holes (627, 647) can communicate with the second connecting hole 124 and the second channel 34. The second connecting hole 124, the second through holes (627, 647), and the second channel 34 each can extend along the axis of the housing 10. The first connecting hole 122 can be aligned with the first through hole 624 of the first connecting member 62, the first through hole 645 of the second connecting member 64, and the first channel 32 in that order. The second connecting hole 124 can be aligned with the second through hole 627 of the first connecting member 62, the second through hole 647 of the second connecting member 64, and the second channel 34 in that order. In at least one embodiment, the first connecting member 62 and the second connecting member 64 can both be made of ceramic materials which have wear-resistant and high-temperature properties. A contact surface of the first connecting member 62 and the second connecting member 64 can be smoothed via a surface treatment, such as a mirror-finish treatment.

A seal member 70 can be installed on the resisting portion 624 to seal the first connecting member 62 and the second connecting member 64. A seal member 70 can be received in the receiving groove 18 to seal the channel portion 12 and the first connecting member 62. A seal member 70 can be installed on the bottom wall of the receiving groove 36 to seal the rotation member 30 and the second connecting member 64. A seal member 70 can be sleeved on the connecting portion 644 of the second connecting member 64 adjacent to the rotation member 30 to seal the rotation member 30 and the second connecting member 64. In at least one embodiment, the seal members 70 can be O-rings made of flexible and resilient materials.

The resisting member 80 can be substantially circular, sleeved on the resisting portion 642 of the second connecting member 64 and the rotation member 30, and partially resist sidewalls of the second chamber portion 1613. The fixing member 82 can be sleeved on the resisting member 80 and resist sidewalls of first chamber portion 1611. The resisting member 80, the first connecting member 62, the second connecting member 64, and sidewalls of the second chamber portion 1613 can cooperatively form a cooling chamber 85 corresponding to the contact surface of the first connecting member 62 and the second connecting member 64. The cooling chamber 85 can communicate with the injection hole 11, and the stopper 90 can be inserted in the injection hole 11 to seal the cooling chamber 85.

In use, the connecting heads 20 can be coupled to the first and second conduits, the rotation member 30 can be coupled to the workstation, and a lubricant (not shown) can be injected into the cooling chamber 85 via the injection hole 11. A high-pressure liquid medium, such as an air source, can flow into the workstation via the first conduit, the first connecting hole 122, the first through holes (625, 645), and the first channel 32. A negative-pressure liquid medium, such as an air source, can flow into the annular receiving groove 6245 via the second conduit, the second connecting hole 124 and the second through holes (627, 647), and then flow into the workstation via the second channel 34. When the second connecting member 64 rotates with the rotation member 30, the first connecting member 62 can keep still. The lubricant received in the cooling chamber 85 can lower any temperature rise cased by the friction heat of the resisting portions (624, 642).

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure, as defined by the appended claims.

What is claimed is:

1. A rotatable joint comprising:
   a housing having a first end and a second end substantially opposite to the first end, with a housing center axis extending from the first end of the housing to the second end of the housing, the housing defining:
      a receiving chamber extending into the housing from the second end of the housing toward the first end of the housing, the receiving chamber having an end surface, closest to the first end of the housing, and an inner surface extending substantially perpendicular from the end surface toward the second end of the housing;
      a first insertion chamber extending into the housing from the first end of the housing;
      a second insertion chamber extending into the housing from the first end of the housing;
      a first connecting hole extending from the end surface of the receiving chamber to the first insertion chamber and positioned substantially along, and parallel to, the housing center axis, the first connecting hole connecting to the first insertion chamber;
      a second connecting hole, spaced away from the first connecting hole, extending from the end surface of the receiving chamber to the second insertion chamber, substantially parallel to the housing center axis;
   a first connecting head inserted into the first insertion chamber;
   a second connecting head inserted into the second connecting hole;
   a first connecting member with a first end and a second end opposite to, and substantially parallel to, the first end of the first connecting member, and having an annular receiving groove formed within the second end of the first connecting member;
   a second connecting member with a first end and a second end opposite to, and substantially parallel to, the first end of the second connecting member; and
   a rotation member defining a first channel and a second channel;
   wherein, the first connecting member defines a first through hole and a second through hole, with the first through hole extending from the first end of the first connecting member to the second end of the first connecting member and the second through hole extending from the first end of the first connecting member to the annular groove in the second end of the first connecting member;
   wherein, the second connecting member defines a first through hole and a second through hole, with the first through hole of the second connecting member extending from the first end of the second connecting member to the second end of the second connecting member and the second through hole of the second connecting member extending from the first end of the second connecting to the second end of the second connecting member;
   wherein, the first connecting member is positioned within the receiving chamber, with substantially all of the first end of the first connecting member abutting the end surface of the receiving chamber and the first through hole of the first connecting member aligned with the first connecting hole and the second through hole of the first connecting member aligned with the second connecting hole;
   wherein, the second connecting member is positioned within the receiving chamber, with substantially all of the first end of the second connecting member abutting the second end of the first connecting member and aligning the first through hole of the second connecting member with the first connecting hole and aligning the second through hole of the second connecting member with the annular receiving groove of the first connecting member; and
   wherein, the rotation member is partially positioned into the receiving chamber with the first channel communicating with the first through hole of the second connecting member and the second channel communicating with the second through hole of the second connecting member.

2. The rotatable joint of claim 1, wherein the end surface of the receiving chamber is stepped.

3. The rotatable joint of claim 1, wherein a largest diameter of the housing is about 40 millimeters.

4. The rotatable joint of claim 1, wherein the receiving chamber comprises a first chamber portion, a second chamber portion, and a third chamber portion, all communicating with each other in that order, the third chamber portion communicates with the first connecting hole and the second connecting hole, a first end of the rotation member is received in the first chamber portion, and a second end of the rotation member extends out of the housing.

5. The rotatable joint of claim 4, wherein the first connecting member comprises a connecting portion securely installed in the third chamber portion and a resisting portion protruding from an end of the connecting portion and defining the annular receiving groove on an end of the resisting portion away from the connecting portion, the second connecting member comprises a connecting portion securely installed on an end of the rotation member adjacent to the second chamber portion and a resisting portion protruding from an end of the connecting portion of the second connecting member and resisting the resisting portion of the first connecting member.

6. The rotatable joint of claim 5, wherein the rotation member defines a receiving groove on the end adjacent to the second chamber portion to receive the connecting portion of the second connecting member.

7. The rotatable joint of claim 1, wherein the rotatable joint further comprises a seal member sleeved on the second connecting member to seal the second connecting member and the rotation member.

8. The rotatable joint of claim 7, wherein the rotatable joint further comprises a resisting member sleeved on the rotation member and the resisting portion of the second connecting member.

9. The rotatable joint of claim 8, wherein the rotatable joint further comprises a fixing member sleeved on the resisting member and resisting sidewalls of the receiving chamber.

10. The rotatable joint of claim 8, wherein the resisting member resists sidewalls of the receiving chamber, the resisting member, the first connecting member, the second connecting member, and the sidewalls of the receiving chamber cooperatively form a cooling chamber.

11. The rotatable joint of claim 10, wherein the receiving chamber defines an injection hole cut through a sidewall of the receiving chamber and communicating with the cooling chamber, the rotatable joint further comprises a stopper configured to seal the injection hole.

12. The rotatable joint of claim 1, wherein the receiving chamber defines a fixing groove on the end surface, the rotation member defines another fixing groove on an end adjacent to the second connecting member and protrudes a flange from another end away from the second connecting member, the rotatable joint further comprises a bearing and two stopper members, the two stopper members are respectively received in two fixing grooves, the bearing is sleeved on the rotation member and coupled to the housing, a first end of the bearing resists a stopper member, and a second end of the bearing resists another stopper member and the flange.

13. The rotatable joint of claim 1, wherein the rotatable joint further comprises two spaced bearings coupled to the rotation member and the housing and a bushing sandwiched between the two spaced bearings.

14. The rotatable joint of claim 1, wherein the first connecting member and the second connecting member are made of ceramic materials.

15. The rotatable joint of claim 14, wherein a contact surface of the first connecting member relative to the second connecting member and a contact surface of the second connecting member relative to the first connecting member are smoothed.

16. A rotatable joint comprising:
a housing having a first end and a second end substantially opposite to the first end, with a housing center axis extending from the first end of the housing to the second end of the housing, the housing defining:
a receiving chamber extending into the housing from the second end of the housing toward the first end of the housing, the receiving chamber having an end surface, closest to the first end of the housing, and an inner surface extending substantially perpendicular from the end surface toward the second end of the housing;
a first insertion chamber extending into the housing from the first end of the housing;
a second insertion chamber extending into the housing from the first end of the housing;
a first connecting hole extending from the end surface of the receiving chamber to the first insertion chamber and positioned substantially along, and parallel to, the housing center axis, the first connecting hole connecting to the first insertion chamber;
a second connecting hole, spaced away from the first connecting hole, extending from the end surface of the receiving chamber to the second insertion chamber, substantially parallel to the housing center axis;
a first connecting member with a first end and a second end opposite to, and substantially parallel to, the first end, and having an annular receiving groove formed within the second end of the first connecting member;
a second connecting member with a first end and a second end opposite to, and substantially parallel to, the first end of the second connecting member; and
a rotation member defining a first channel and a second channel;
wherein, the first connecting member defines a first through hole and a second through hole, with the first through hole extending from the first end of the first connecting member to the second end of the first connecting member and the second through hole extending from the first end of the first connecting member to the annular groove in the second end of the first connecting member;
wherein, the second connecting member defines a first through hole and a second through hole, with the first through hole of the second connecting member extending from the first end of the second connecting member to the second end of the second connecting member and the through hole of the second connecting member extending from the first end of the second connecting to the second end of the second connecting member;
wherein, the first connecting member is positioned within the receiving chamber, with substantially all of the first end of the first connecting member abutting the end surface of the receiving chamber and the first through hole of the first connecting member aligned with the first connecting hole and the second through hole of the first connecting member aligned with the second connecting hole;
wherein, the second connecting member is positioned within the receiving chamber, with substantially all of the first end of the second connecting member abutting the second end of the first connecting member and aligning the first through hole of the second connecting member with the first connecting hole and aligning the second through hole of the second connecting member with the annular receiving groove of the first connecting member; and
wherein, the rotation member is partially positioned into the receiving chamber with the first channel communicating with the first through hole of the second connecting member and the second channel communicating with the second through hole of the second connecting member.

* * * * *